United States Patent
Sprague et al.

(10) Patent No.: US 8,964,929 B2
(45) Date of Patent: Feb. 24, 2015

(54) METHOD AND APPARATUS FOR A JET PUMP THREE POINT SLIP JOINT CLAMP

(75) Inventors: Robin D. Sprague, Wilmington, NC (US); Bret E. Nelson, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 984 days.

(21) Appl. No.: 12/982,280

(22) Filed: Dec. 30, 2010

(65) Prior Publication Data

US 2012/0170704 A1 Jul. 5, 2012

(51) Int. Cl.
| G21C 15/00 | (2006.01) |
| G21C 19/28 | (2006.01) |
| G21C 13/032 | (2006.01) |
| G21C 15/25 | (2006.01) |

(52) U.S. Cl.
CPC ............. *G21C 13/032* (2013.01); *G21C 15/25* (2013.01); *Y02E 30/31* (2013.01)
USPC ........................................................ 376/372

(58) Field of Classification Search
CPC ....... G21C 15/25; G21C 13/032; Y02E 30/31
USPC ........................................................ 376/372
See application file for complete search history.

(56) References Cited

U.S. PATENT DOCUMENTS

| 6,394,765 B1 | 5/2002 | Erbes et al. |
| 6,435,839 B1* | 8/2002 | Erbes ............................... 417/63 |
| 6,438,192 B1* | 8/2002 | Erbes et al. .................... 376/372 |
| 6,663,269 B1* | 12/2003 | Leu ................................ 362/487 |
| 2008/0107227 A1* | 5/2008 | Koepke .......................... 376/302 |
| 2008/0144761 A1 | 6/2008 | Jensen et al. |

OTHER PUBLICATIONS

ES Search Report dated Oct. 24, 2013 for corresponding ES Application No. 201132125.

* cited by examiner

*Primary Examiner* — Frank J McGue
(74) *Attorney, Agent, or Firm* — Harness, Dickey & Pierce, P.L.C.

(57) ABSTRACT

A method and apparatus for providing a Boiling Water Reactor (BWR) jet pump three point slip joint clamp to mitigate sleep joint leakage flow induced vibration of a BWR jet pump assembly. A collar, provided as one seamless component or in separate portions, is installed on the upper crown of a diffuser. The collar includes a lower set of fasteners and an upper set of fasteners that contact the inlet mixer and diffuser, respectively, to horizontally stabilize the inlet mixer in a fixed position inside of the diffuser. The upper fasteners may be anchored by bosses that ensure a light-weight design of the collar. An optional cantilevered seal (including a cantilevered overhang and a lip) may mitigate leakage from the slip joint interface.

12 Claims, 8 Drawing Sheets

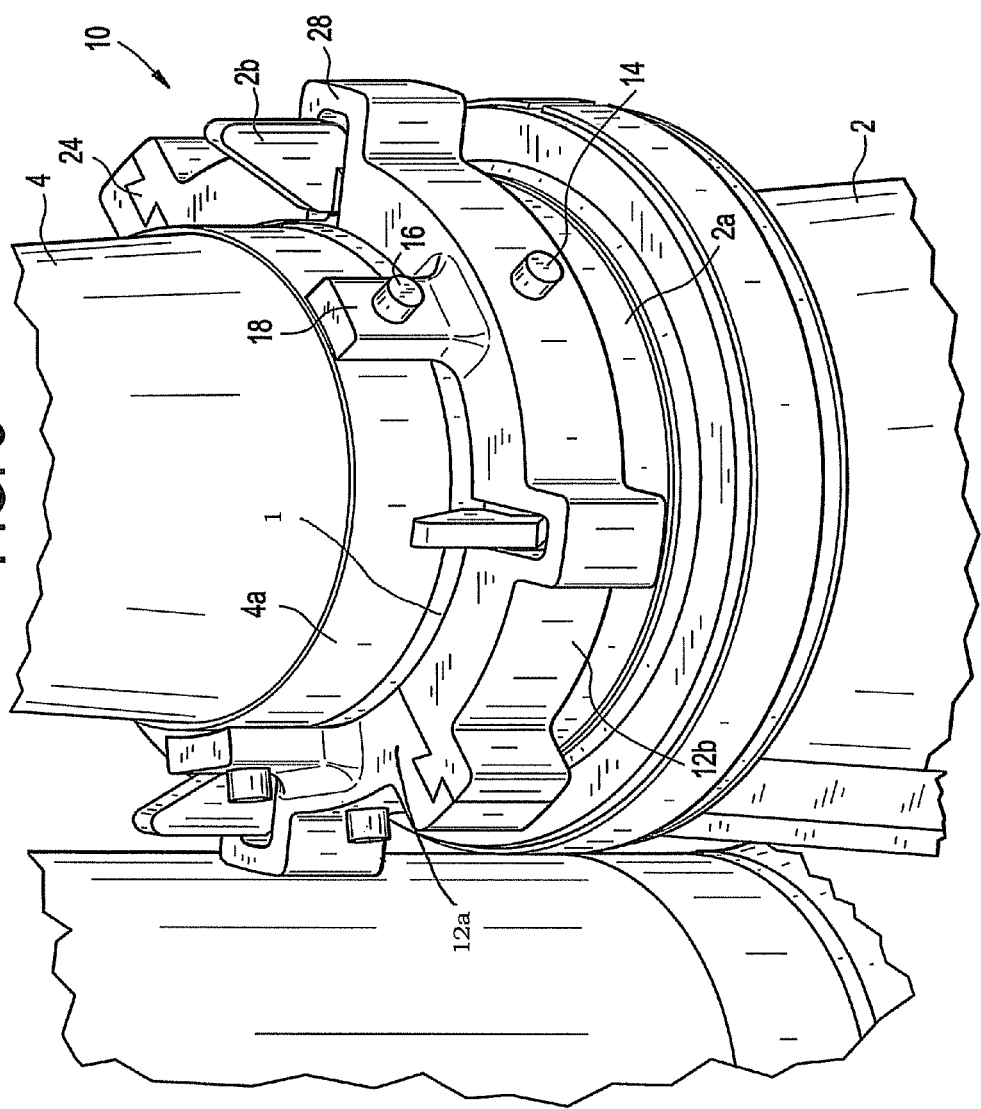

METHOD AND APPARATUS FOR A JET PUMP THREE POINT SLIP JOINT CLAMP

BACKGROUND OF THE INVENTION

1. Field of the Invention

Example embodiments relate generally to nuclear reactors, and more particularly to a method and apparatus for a Boiling Water Reactor (BWR) jet pump three point slip joint clamp used to prevent leakage and vibration while constraining an interface between the inlet mixer and diffuser of a BWR jet pump assembly.

2. Related Art

A reactor pressure vessel (RPV) of a boiling water reactor (BWR) typically has a generally cylindrical shape and is closed at both ends (for example by a bottom head and a removable top head). A top guide typically is spaced above a core plate within the RPV. A core shroud, or shroud, typically surrounds the core and is supported by a shroud support structure. Particularly, the shroud has a generally cylindrical shape and surrounds both the core plate and the top guide. There is a space or annulus between the cylindrical reactor pressure vessel and the cylindrically shaped shroud.

In a BWR, hollow tubular jet pumps positioned within the shroud annulus provide the required reactor core water flow. The upper portion of the jet pump, known as the inlet mixer, is laterally positioned and may be supported by conventional jet pump restrainer brackets. While conventional jet pump restrainer brackets may provide system stiffness that mitigates vibration of system components, slip joint leakage flow induced vibration (SJLFIV) may still occur between the inlet mixers and the diffusers. Slip joint leakage FIV causes high vibratory loads, which have been identified as a root cause of jet pump assembly vibration damage.

Conventionally, many attempts have been made to reduce slip joint leakage FIV. For instance, auxiliary wedges at the set screws of restrainer brackets, labyrinth seals, restrainer bracket pad repair, slip joint clamps and replacement main wedges have all been used. While these conventional solutions have provided some additional system stiffness, none of the solutions mitigate leakage and vibration at the actual slip joint interface without placing additional loads on the slip joint interface between the inlet mixer and the diffuser. In particular, conventional slip joint clamp designs have mitigated vibration, though they have increased the overall load being placed on the slip joint interface.

SUMMARY OF INVENTION

Example embodiments provide a method and an apparatus for a jet pump three point slip joint clamp. Example embodiments provide a light weight collar with points of contact on both the inlet mixer and the diffuser to horizontally stabilize the inlet mixer as it is seated in the diffuser. The horizontal stabilization of the inlet mixer, and the diffuser, reduce the overall loads being placed on the slip joint interface. Optionally, the slip joint clamp may also include a seal to prevent leakage at the interface between the inlet mixer and the diffuser.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

FIG. 8 is a close-up view of a jet pump three point slip joint clamp installed on a BWR jet pump assembly, in accordance with an example embodiment.

DETAILED DESCRIPTION

Figure 1:
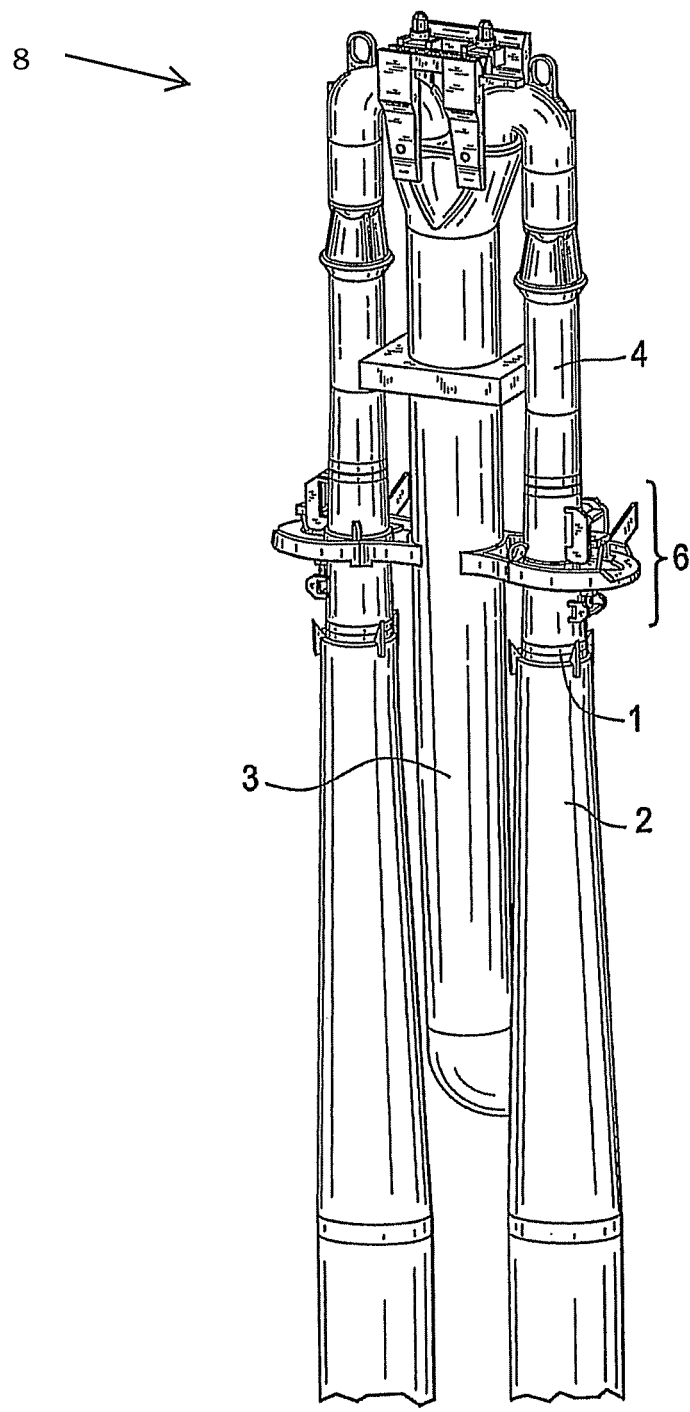
FIG. 1 is a perspective view of a conventional boiling water nuclear reactor (BWR) jet pump assembly.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular fauns disclosed, but to the contrary, example embodiments are to cover all modifications, equivalents, and alternatives falling within the scope of example embodiments. Like numbers refer to like elements throughout the description of the figures.

It will be understood that, although the ter ins first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural for ms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is a perspective view of a conventional nuclear boiling water reactor (BWR) jet pump assembly 8. The major components of the jet pump assembly 8 include a riser pipe 3 and two inlet mixers 4 that insert into respective diffusers 2. Conventionally, jet pump restrainer brackets 6 are used to stabilize movement of the inlet mixers 4 and reduce movement (i.e., slip joint leakage Flow Induced Vibration, or FIV) of and leakage at the slip joint 1 that exists at the interface between the inlet mixers 4 and the diffusers 2.

Figure 2:
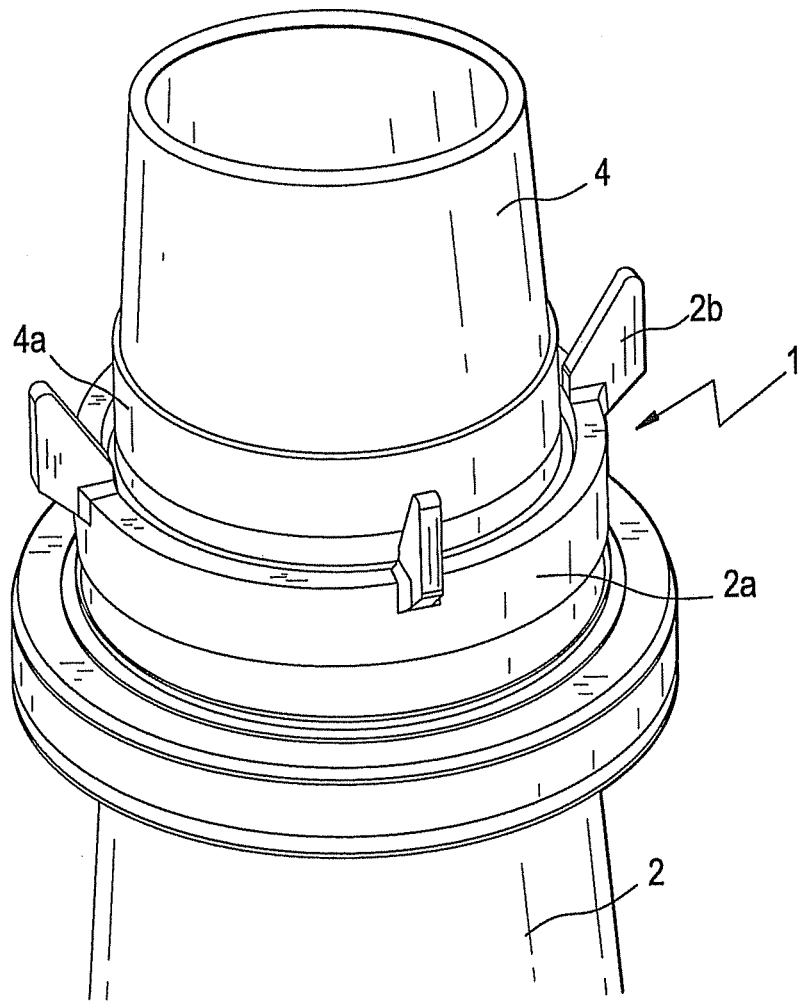
FIG. 2 is a detailed view of a conventional slip joint that exists between an inlet mixer and a diffuser of a BWR jet pump assembly.

FIG. 2 is a detailed view of a conventional slip joint that exists between an inlet mixer 4 and a diffuser 2 of a BWR jet pump assembly. It should be noted that the bottom portion 4a of the inlet mixer 4 inserts into the upper crown 2a of the diffuser 2 (which also includes guide ears 2b). The interface between the inlet mixer 4 and the diffuser 2 is referred to as a "slip joint" 1.

Figure 3:
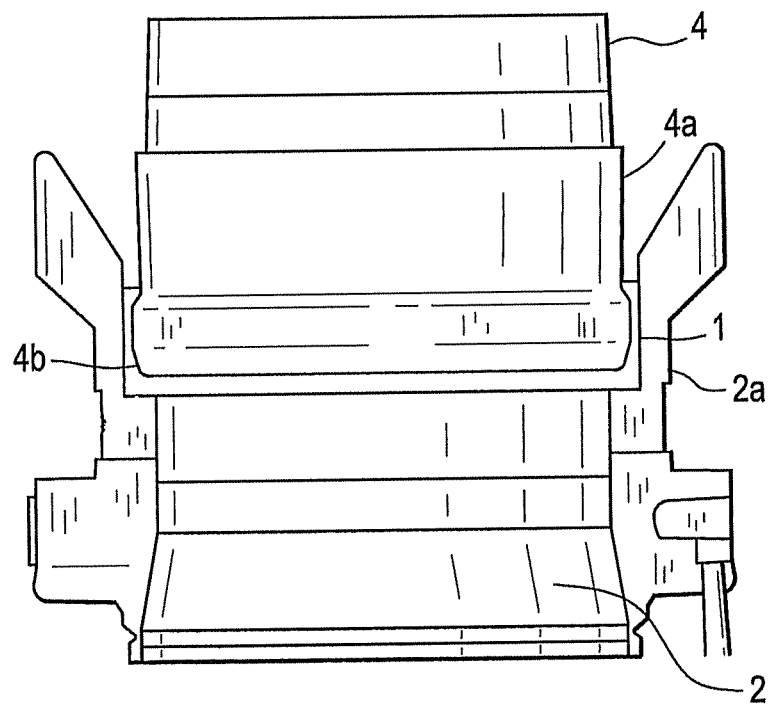
FIG. 3 is a cross-sectional view of a conventional slip joint that exists between an inlet mixer and a diffuser of a BWR jet pump assembly.

FIG. 3 is a cross-sectional view of a conventional slip joint 1 that exists between an inlet mixer 4 and a diffuser 2 of a BWR jet pump assembly. The lowest distal end 4b of inlet mixer 4 rests in the upper crown 2a of diffuser 2, to form slip joint 1. Conventionally, inlet mixer FIV may occur in the slip joint 1 when tolerances between the distal end 4b of the inlet mixer 4 and the upper crown 2a of diffuser 2 do not exactly match. Additionally, leakage may occur at the interface, as water may leak between the lowest distal end 4b of the inlet mixer and the upper crown 2a of the diffuser and out of the slip joint 1.

Figure 4:
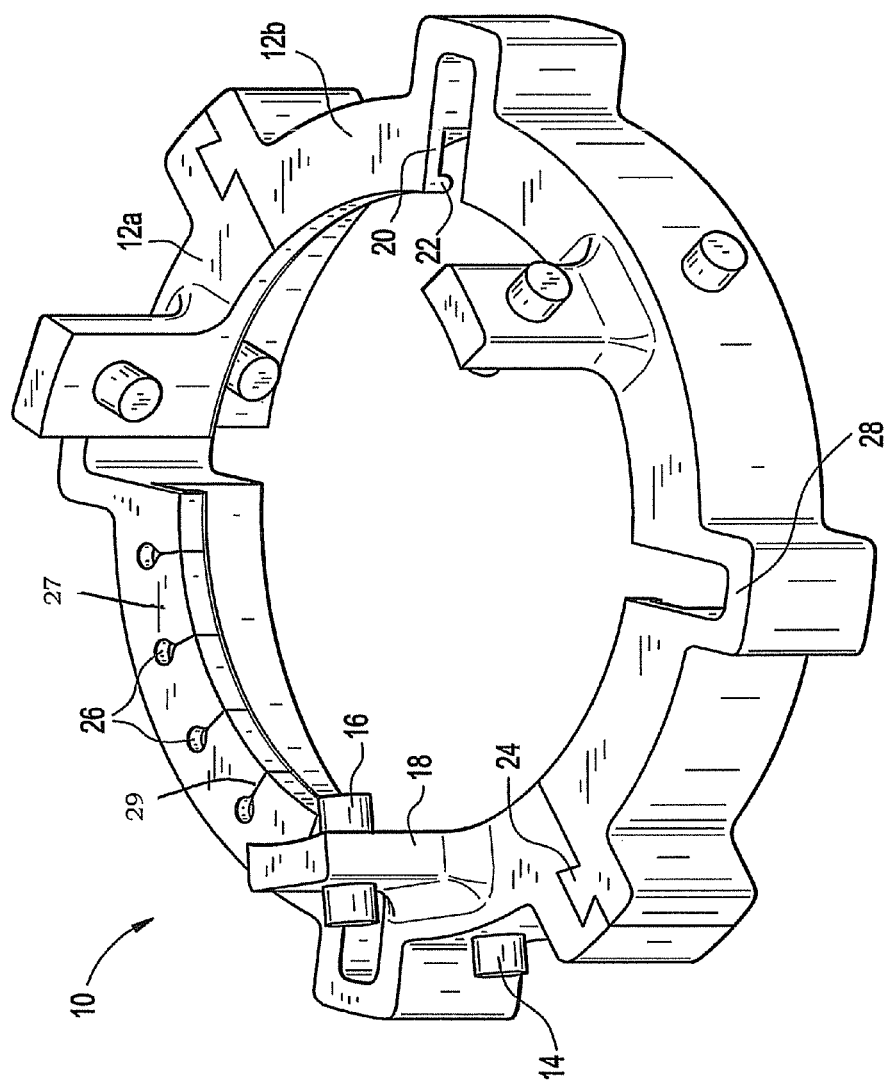
FIG. 4 is a detailed view of a jet pump three point slip joint clamp, in accordance with an example embodiment.

FIG. 4 is a detailed view of a jet pump three point slip joint clamp 10, in accordance with an example embodiment. The clamp 10 may include two semi-circular opposing collars (12a/12b) joined together by dovetail joints 24. Alternative to two collar portions, one seamless collar may also be used. However, the use of one seamless collar requires the removal of the inlet mixer 4 from the diffuser 2 during installation. Additionally, a collar that is broken into more than two portions may also be used. Alternative to dovetail joints 24, other ways of attaching collar portions (12a/12b) may instead be implemented, such as the use of pins, bolts, bolted flanges, clamps, welding, etc.

The collar portions (12a/12b) may have two sets of fasteners. A lower set of fasteners 14 (including one or more fasteners) located at a lower elevation of the collar 12a/12b, and an upper set of fasteners 16 (including one or more fasteners) located at a higher elevation of the collar 12a/12b. Both sets of fasteners penetrate the collar 12a/12b and are radially aligned with a center of the collar 12a/12b (i.e., they face a center of the collar 12a/12b). The set of lower fasteners may engage the upper crown 2a of the diffuser (shown in FIGS. 7-8) and the upper set of fasteners may engage the bottom portion 4a of the inlet mixer (also shown in FIGS. 7-8). The fasteners 14/16 ensure that the inlet mixer and the diffuser are horizontally stabilized. Additionally, by using three lower fasteners 14 and three upper fasteners, the inlet mixer and diffuser may be stabilized without placing any load on the slip joint interface (thereby avoiding loading of potentially worn surfaces). Fasteners 14/16 may horizontally stabilize and support the inlet mixer 4 in a fixed concentric (or, eccentric) position within the upper crown 2a of the diffuser (i.e., the force of the collar and fasteners 14/16 "lock in" the inlet mixer, in one horizontal position in the diffuser). It should be noted that the final axial position of the inlet mixer 4 may be either concentric, or eccentric, in relation to the diffuser 2. An eccentric position of the inlet mixer 4 within the diffuser 2 may be tolerated, as an eccentric position is not disadvantageous to the overall performance of the jet pump assembly.

Figure 7:
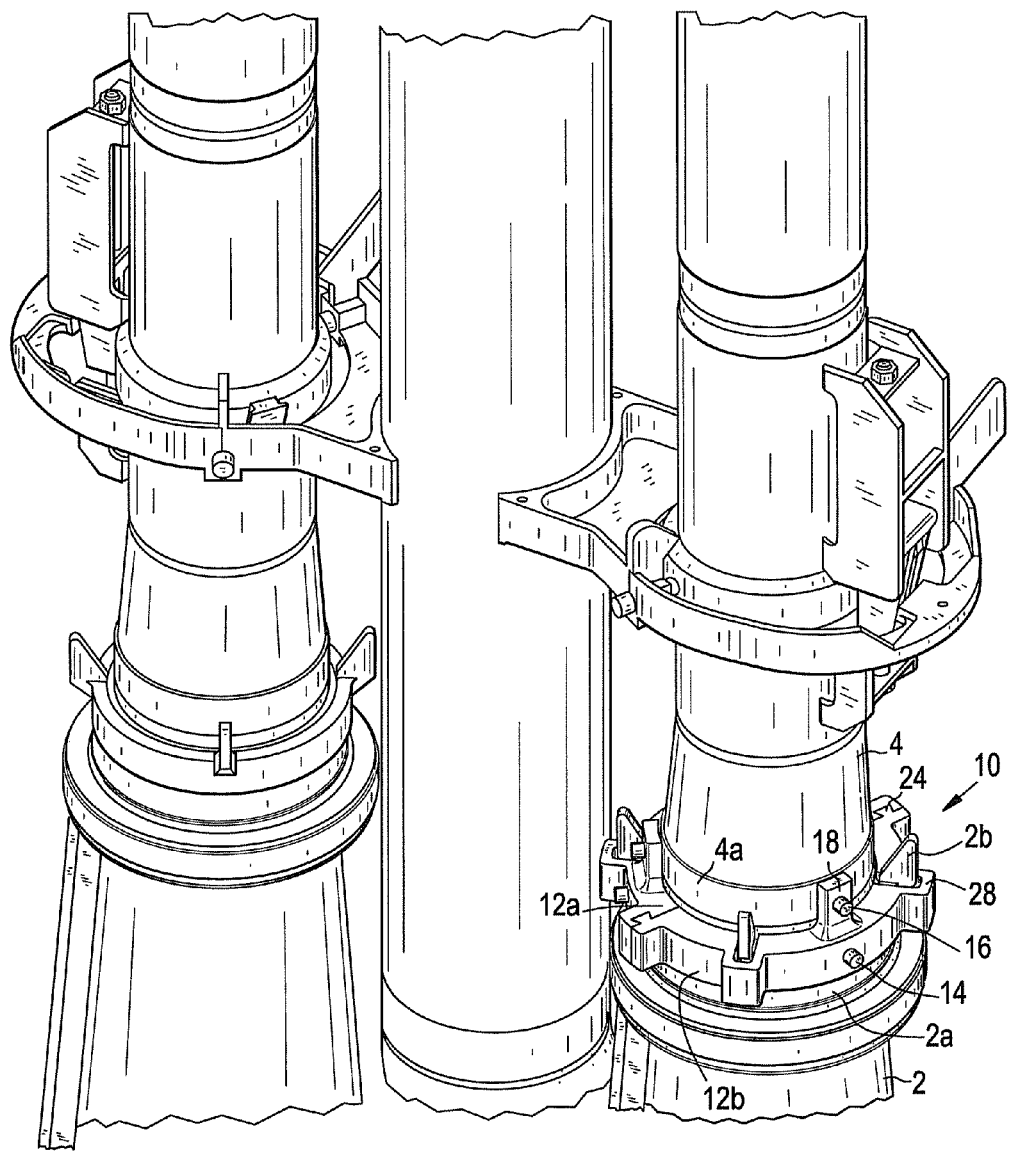
FIG. 7 is a perspective view of a jet pump three point slip joint clamp installed on a BWR jet pump assembly, in accordance with an example embodiment.

Fasteners 14/16 may be threaded, allowing the fasteners 14/16 to be screwed into the collar 12a/12b and toward the center of the collar 12a/12b. Fasteners 14/16 may be jacking bolts. Fasteners 14/16 may also be set screws, springs, double acting wedges (driven with socket head cap screws with ratchet keepers), or other such fasteners that may penetrate the collar and provide a horizontal load by contacting the side of the inlet mixer 4 and diffuser 2. Once the fasteners are tightened to horizontally load the inlet mixer and diffuser (as shown in FIGS. 7-8), the force of the fasteners may energize the collars 12a/12b (similar to the stored energy existing in a cold spring), thereby offering a further stabilizing support of the slip joint interface. All fasteners may include anti-rotational structure as well, which may include crimp collars or ratchet keepers.

In FIG. 4, a set of three lower fasteners 14 and three upper fasteners 16 is provided. However, the total number of upper and lower fasteners (12a/12b) may be increased or decreased. Each of the upper fasteners 16 may be located on a boss 18 that vertically protrudes from a top portion of the collar 12a/12b. The bosses 18 ensure that the upper fasteners 16 are at a higher elevation than the lower fasteners 14. the bosses 18 also provide the collar 12a/12b with a light-weight design, as the bosses 18 may be used in lieu of using a thicker collar.

Offsets 28 may be included to provide a clearance for diffuser guide ears 2b. Optionally, collars 12a/12b may include a horizontally projecting cantilevered overhang 20 that protrudes toward a center of collar 12a/12b. The overhang 20 may include a vertically projecting lip 22 on a distal end of the overhang 20, the lip 22 protruding in a downward direction. The overhang 20 and lip 22 may be sized to allow the lip 22 to fit into the actual slip joint interface itself (i.e., lip 22 may fit in between the bottom portion 4a of the inlet mixer and the upper crown 2a of the diffuser). The combination of overhang 20 and lip 22 provides a "cantilevered seal" that mitigates leakage between the inlet mixer 4 and the diffuser 2.

Optionally, fingers 27 may also be provided in the cantilevered overhang 20. The fingers 27 may be defined by circular holes 26 penetrating the overhang 20 at a location that is toward a midsection of the overhang 20 (i.e., the holes 26 may be located toward a center of the width of a top surface of the overhang 20), and narrow slits 29 running through the holes and clear through a distal end of the overhang 20 (and, clear through lip 22, if lip 22 is optionally provided), as shown in FIG. 4. The fingers 27 may provide stress relief to the collars 12a/12b, which may be advantageous in the overall performance of the clamp 10.

Figure 5:
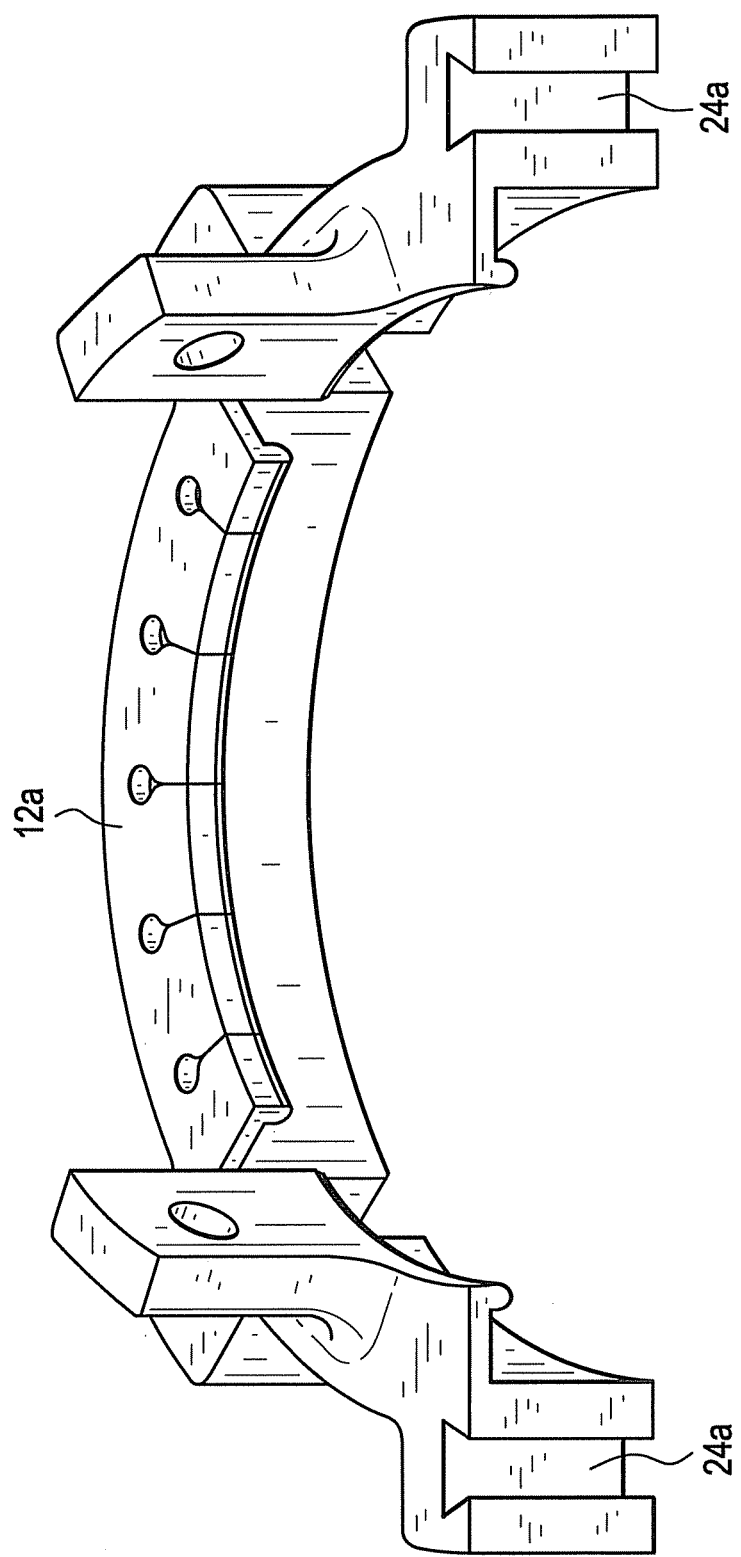
FIG. 5 is a detailed view of a first half of a jet pump three point slip joint clamp, in accordance with an example embodiment.

FIG. 5 is a detailed view of a first half 12a of a jet pump three point slip joint clamp 10, in accordance with an example embodiment. In this figure, the female portion (female slots) 24a of the dovetail joints 24 (shown in FIG. 4) can be seen.

Figure 6:
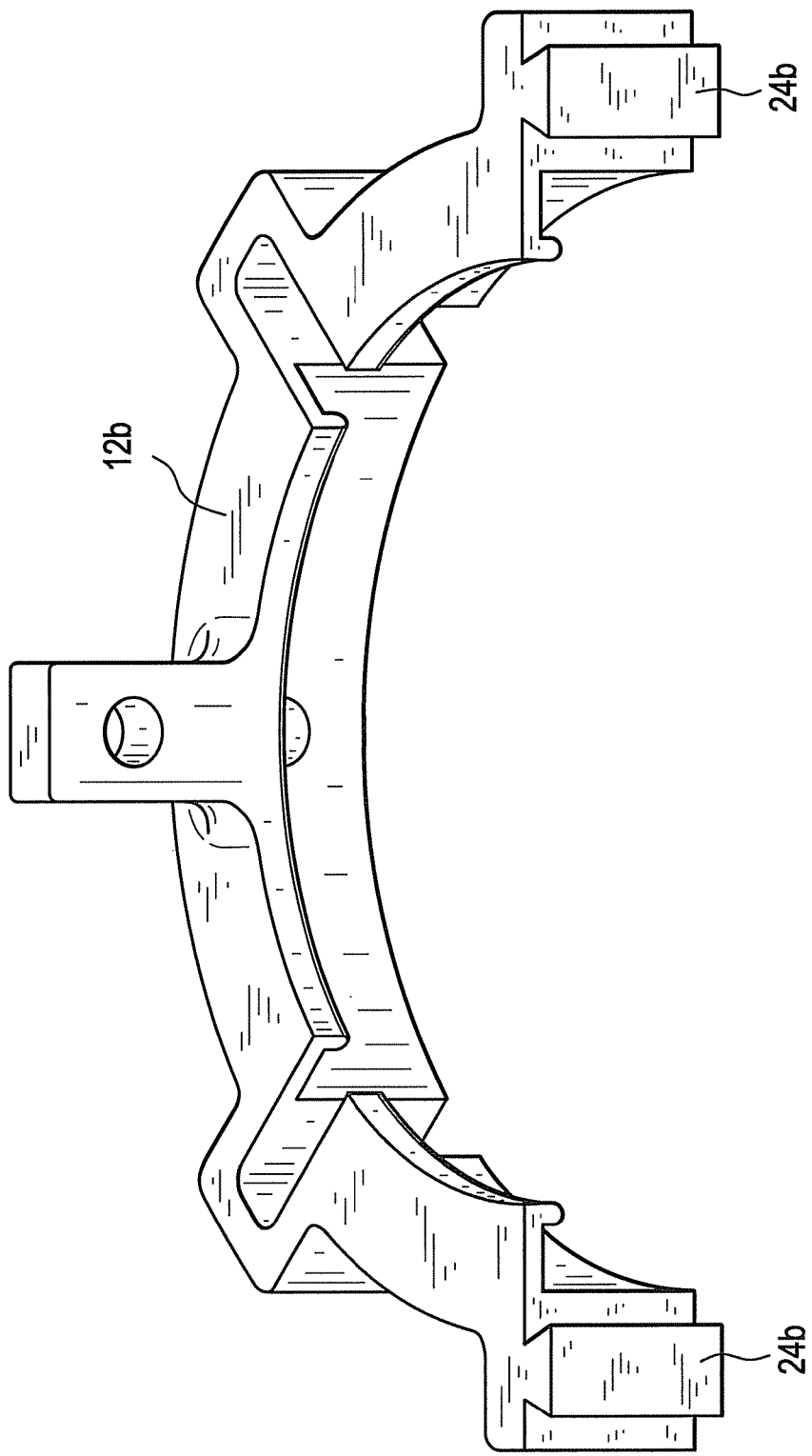
FIG. 6 is a detailed view of a second half of a jet pump three point slip joint clamp, in accordance with an example embodiment.

FIG. 6 is a detailed view of a second half 12b of a jet pump three point slip joint clamp 10, in accordance with an example embodiment. In this figure, the male portion 24b of the dovetail joints 24 (shown in FIG. 4) can be seen.

FIG. 7 is a perspective view of a jet pump three point slip joint clamp 10 installed on a BWR jet pump assembly 8, in accordance with an example embodiment. Collars 12a/12b may be installed on the upper crown 2a of the diffuser 2. Therefore, lower fasteners 14 may engage the upper crown 2a to stabilize the clamp 10 on the diffuser 2. Bosses 18 may vertically project from the top of the clamp 10, allowing upper fasteners 16 to engage the lower portion 4a of the inlet mixer 4. Notice that offset 28 provides a clearance for guide ears 2b. Because this example embodiment includes a collar with two portions (12a/12b), clamp 10 may be fashioned onto an existing jet pump assembly 8 without the need for removing the inlet mixer 4 from the diffuser 2, for easy installation. Dovetail joints 24 provide a quick and effective means of joining both collars (12a/12b).

FIG. 8 is a close-up view of a jet pump three point slip joint clamp 10 installed on a BWR jet pump assembly 8, in accordance with an example embodiment. This close-up view provides a clearer view of the components shown in FIG. 7. In this embodiment, the cantilevered seal (cantilevered overhang 20 and lip 22, shown in FIG. 4) are used to seal off the slip joint interface 1 itself, to mitigate leakage that may otherwise occur between the inlet mixer 4 and the diffuser 2.

Materials of construction for clamp 12a/12b may be austenitic stainless steel, XM-19, X-750, or other equivalent material. The fasteners, alternate wedges, and anti-rotational components (such as ratchet keepers) may also be made from the aforementioned materials.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A boiling water reactor (BWR) jet pump assembly slip joint clamp, comprising:
   a circular collar with an annular, vertical sidewall having top and bottom surfaces, the collar having a longitudinal central axis existing along a vertical line running through the center of the collar;
   at least one horizontally-oriented first fastener penetrating through the vertical sidewall of the collar, the at least one first fastener being radially aligned with the longitudinal central axis of the collar; and
   at least one horizontally-oriented second fastener penetrating through the vertical sidewall of the collar, the at least one second fastener being radially aligned with the longitudinal central axis of the collar, the at least one first fastener penetrating the vertical sidewall closer to the bottom surface of the vertical sidewall, at a lower elevation of the sidewall, as compared to the location of the at least one second fastener.

2. The clamp of claim 1, further comprising:
   bosses vertically protruding from a top portion of the collar, each of the first fasteners penetrating a boss.

3. The clamp of claim 2, further comprising:
   threads on each fastener, the threads allowing the fasteners to be screwed into the collar and toward the center of the collar.

4. The clamp of claim 3, wherein the fasteners are jacking bolts.

5. The clamp of claim 2, wherein,
   the at least one first fastener including three lower fasteners, and
   the at least one second fastener including three upper fasteners.

6. The clamp of claim 2, further comprising:
   at least one offset on the collar, the offset defining a vertically-oriented slot along an entire vertical length of the vertical sidewall of the collar that provides a clearance for guide ears of a diffuser of a BWR jet pump assembly.

7. The clamp of claim 2, wherein the collar includes two semi-circular portions joined together by dovetail joints.

8. The clamp of claim 2, wherein the collar is one seamless collar.

9. The clamp of claim 2, further comprising:
   a horizontally projecting cantilever overhang attached to the collar, the cantilever overhang protruding toward the center of the collar.

10. The clamp of claim 9, further comprising:
    a vertically projecting lip on a distal end of the cantilever overhang, the lip protruding in a downward direction.

11. The clamp of claim 9, further comprising:
    at least one finger included in the cantilever overhang, the at least one finger defining a circular hole located toward a midsection of the cantilever overhang and a slit penetrating the overhang between the hole and a distal end of the overhang, the circular hole having a greater width than a width of the slit.

12. The clamp of claim 1, wherein,
    the collar is configured to encircle an interface between a diffuser and an inlet mixer,
    the at least one first fastener being configured to contact a sidewall of the diffuser,
    the at least one second fastener being configured to contact a sidewall of the inlet mixer.

* * * * *